United States Patent
Zarubin

(10) Patent No.: US 10,805,276 B2
(45) Date of Patent: Oct. 13, 2020

(54) DEVICE AND METHODS FOR SAFE CONTROL OF VEHICLE EQUIPMENT SECURED BY ENCRYPTED CHANNEL

(71) Applicant: Comodo Security Solutions, Inc., Clifton, NJ (US)

(72) Inventor: Evgeny Zarubin, Odessa (UA)

(*) Notice: Subject to any disclaimer, the term of this patent is extended or adjusted under 35 U.S.C. 154(b) by 223 days.

(21) Appl. No.: 16/120,234

(22) Filed: Sep. 1, 2018

(65) Prior Publication Data
US 2019/0075089 A1 Mar. 7, 2019

Related U.S. Application Data

(60) Provisional application No. 62/554,323, filed on Sep. 5, 2017.

(51) Int. Cl.
| | |
|---|---|
| H04L 29/06 | (2006.01) |
| H04L 9/08 | (2006.01) |
| H04W 12/04 | (2009.01) |
| H04L 9/32 | (2006.01) |
| H04W 4/48 | (2018.01) |

(52) U.S. Cl.
CPC .......... *H04L 63/0442* (2013.01); *H04L 9/083* (2013.01); *H04L 9/0825* (2013.01); *H04L 9/3268* (2013.01); *H04W 4/48* (2018.02); *H04W 12/04* (2013.01); *H04L 2209/80* (2013.01); *H04L 2209/84* (2013.01)

(58) Field of Classification Search
CPC ... H04L 63/0442; H04L 9/0825; H04L 9/083; H04L 9/03268; H04L 2209/80; H04L 2209/84; H04W 4/48; H04W 12/04
See application file for complete search history.

(56) References Cited

U.S. PATENT DOCUMENTS

| | | | | |
|---|---|---|---|---|
| 5,883,443 | A * | 3/1999 | Wilson | B60R 25/04 180/287 |
| 9,031,237 | B2 * | 5/2015 | Alrabady | G06F 21/62 380/277 |
| 10,200,371 | B2 * | 2/2019 | Darnell | H04L 9/0866 |
| 2004/0003228 | A1 * | 1/2004 | Fehr | H04L 67/12 713/155 |
| 2008/0167773 | A1 * | 7/2008 | Gumpinger | G07C 5/008 701/32.6 |
| 2008/0232595 | A1 * | 9/2008 | Pietrowicz | G06Q 20/3829 380/277 |
| 2011/0296180 | A1 * | 12/2011 | Paeschke | B60R 13/10 713/168 |
| 2016/0352709 | A1 * | 12/2016 | Nunally | H04L 9/0877 |
| 2017/0353302 | A1 * | 12/2017 | Fernandez | G06F 21/6254 |

(Continued)

*Primary Examiner* — Ghodrat Jamshidi
(74) *Attorney, Agent, or Firm* — Joseph P. Aiena

(57) ABSTRACT

There are disclosed methods and a system for safe management of various devices of a vehicle. These are car alarm system, immobilizer, central lock, etc. The method can be used in on-board computer of car and in various separate devices managing other devices in car. The method is applicable as a safety measure for all situations where safe management of devices is required, for example, managing the premises security. A central unit and folding key exchanges data via an encrypted channel. Each time the folding key and central unit interchange data, there is formed unique data set so even if the malicious third party intercepts data they will not be able to use it for future interactions.

5 Claims, 6 Drawing Sheets

(56) References Cited

U.S. PATENT DOCUMENTS

| | | | |
|---|---|---|---|
| 2018/0089918 A1* | 3/2018 | Murray | G07C 9/20 |
| 2018/0123804 A1* | 5/2018 | Smith | H04L 9/30 |
| 2018/0254903 A1* | 9/2018 | Bardelski | H04L 9/3228 |
| 2019/0238325 A1* | 8/2019 | Takemori | H04W 12/04071 |

* cited by examiner

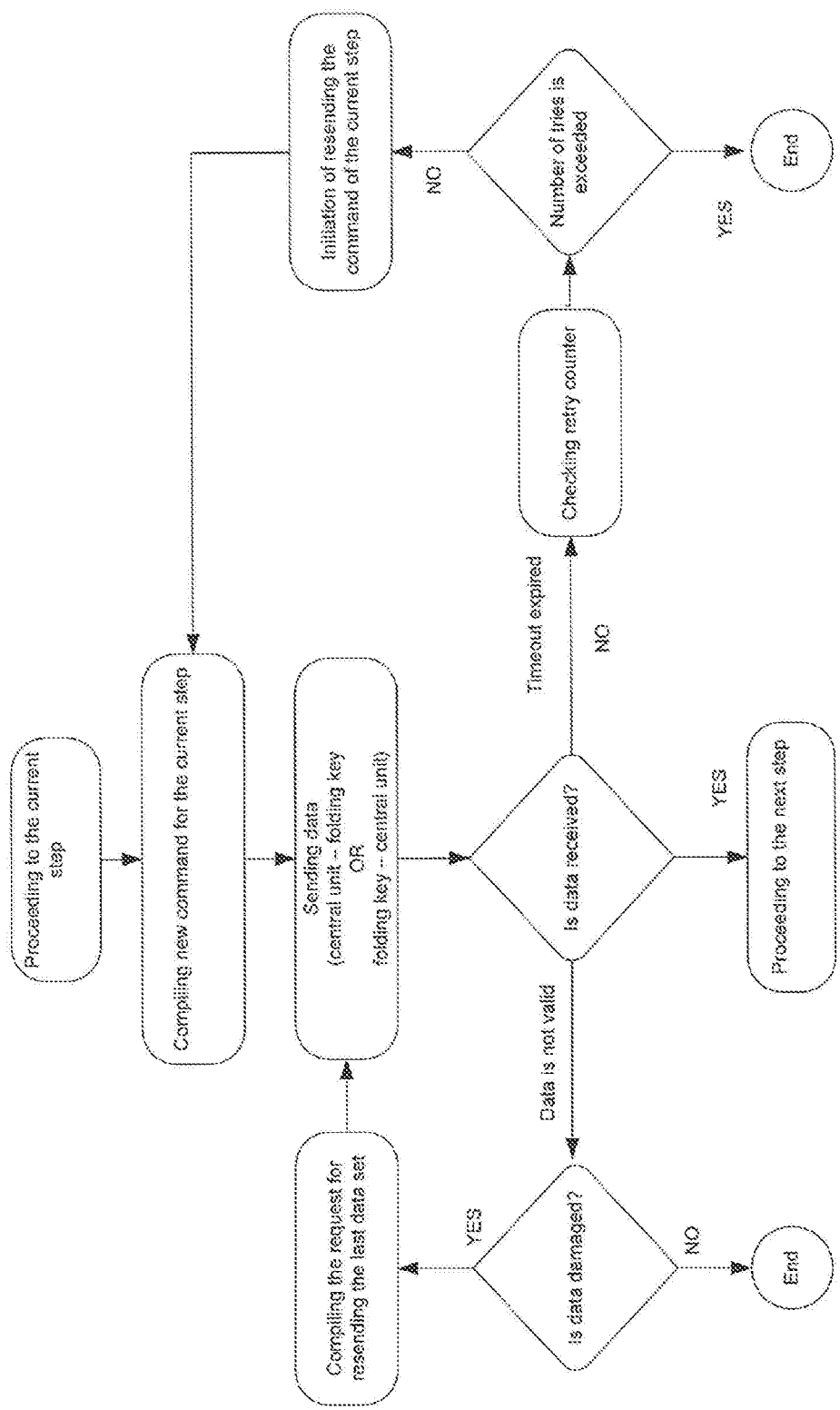

DEVICE AND METHODS FOR SAFE CONTROL OF VEHICLE EQUIPMENT SECURED BY ENCRYPTED CHANNEL

CROSS REFERENCE TO RELATED APPLICATIONS

This application claims priority to and benefit of U.S. Provisional Application Ser. No. 62/554,323 filed on Sep. 5, 2017 which is herein incorporated by reference in its entirety.

BACKGROUND

With the increased automation and computerization of vehicles, the possibility of breaking the vehicle's security by cyberattacks on the on-board electronics or by intercepting data by malicious third parties grows.

Signal-grabbers can easily catch the signal used by, for example, car alarm system, even being at that moment far away, so vehicle owner will not have any hint of this intrusion. Then, the thieves just repeat the signal and the lock will be open.

One of the possible methods to solve the issue is signal scrambling, but it does not provide real protection, since even scrambled, the signal is expected by receiver. Another choice is encryption algorithm, but it should be sophisticated enough so it can not be intercepted and decoded by frauds.

Thus, there is need in new method for safe managing devices of vehicle so the sensitive data could not be intercepted by thieves.

SUMMARY OF INVENTION

The current invention is a method and system for safe management of various devices of vehicle. These are car alarm system, immobilizer, central lock, etc. The invention method can be used in on-board computer of car and in various separate devices managing other devices in car. Also, the invention method is applicable as a safety measure for all situations where safe management of devices is required, for example, managing the premises security.

The present invention functions by having central unit and folding key exchange data via encrypted channel. An advantage of the invention is that each time the folding key and central unit are interchanging data there will be formed unique data set so even if the malicious third party intercepts data they will not be able to use it for future interactions.

Additionally, if the folding key is not used anymore for the central unit, the authorization data of this folding key will be deleted from central unit. So, this folding key will not be able to activate central unit in future.

BRIEF DESCRIPTION OF DRAWINGS

FIG. 4A is a depiction of another embodiment of the invention where general algorithm of data interchanging between central unit and folding key is shown.

DETAILED DESCRIPTION

The present invention discloses methods and systems for safe management of various devices of vehicle where central unit and folding key exchange data via encrypted channel. Each time encryption is performed there is used unique data set which is never repeated again.

Figure 1:
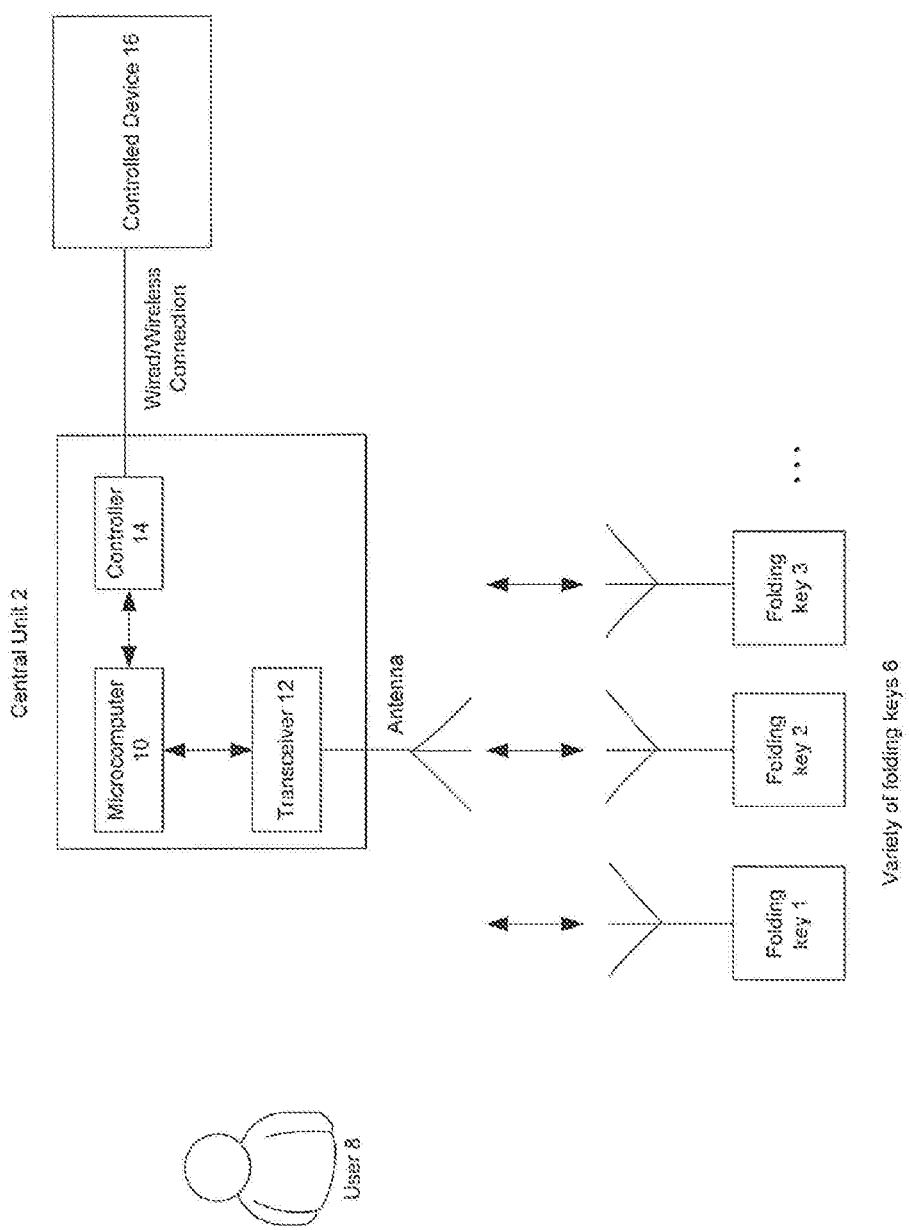
FIG. 1 is a depiction of general scheme of the invention.

FIG. 1 shows general scheme of invention. Invention comprises two devices: one central unit 2 located on vehicle 4 and variety of folding keys 6 of vehicle owner or user 8. Central unit 2 comprises microcomputer 10, transceiver 12 and controller 14. Transceiver 12 transmits signals to folding keys 6 via antennas. Controller 14 is connected with device that is to be controlled 16 through wired or wireless connection.

Figure 2:
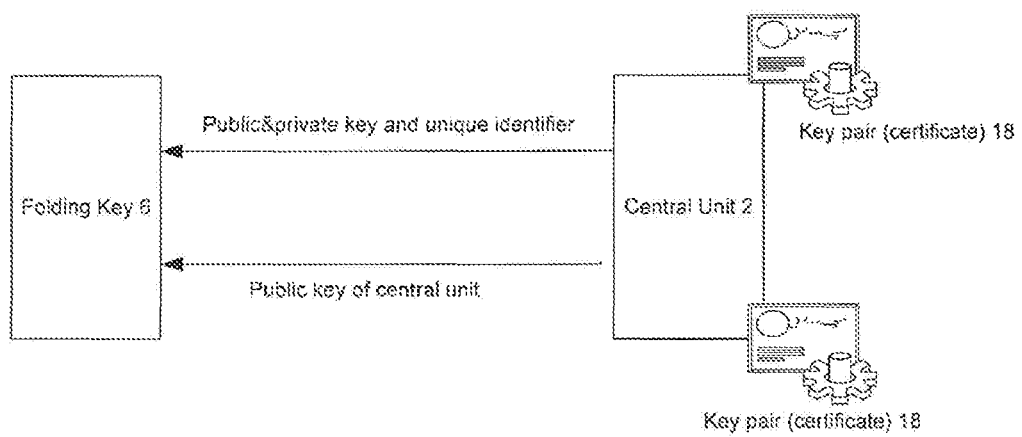
FIG. 2 is a depiction of invention where key pairs (certificates) are initially generated by central unit.

FIG. 2 is a depiction of invention where key pairs (or certificates, such as key pair wrapped in the certificate) 18 are initially generated by central unit 2. Preliminary central unit 2 generates key pair (or certificates, such as key pair wrapped in the certificate) 18 for itself and saves it in memory of microcomputer 10. This is done once before the first usage of the device. Though new key pair (or certificates, such as key pair wrapped in the certificate) 18 can be created by central unit 2 in future for re-initialization of the device if needed (for example, if vehicle owner is changed). For new folding key authorization central unit 2 generates the key pair (or certificates, such as key pair wrapped in the certificate) 18 and unique identifier for folding key 6 in the pairing mode (at this moment the folding key is connected to central unit through wire or wireless connection). Then central unit 2 sends key pair (or certificates, such as key pair wrapped in the certificate) 18 and unique identifier to folding key 6. Central unit 2 saves in memory of its microcomputer 10 only public key and identifier without private key. A key pair comprises a private and public key that can be wrapped in the digital certificate or that can be saved on the central unit directly, without being included in the digital certificate. The decision whether to choose just key pair or key pair wrapped in the certificate depends on the specific properties of the on-board computer or other devices managed in car.

Figure 3A:
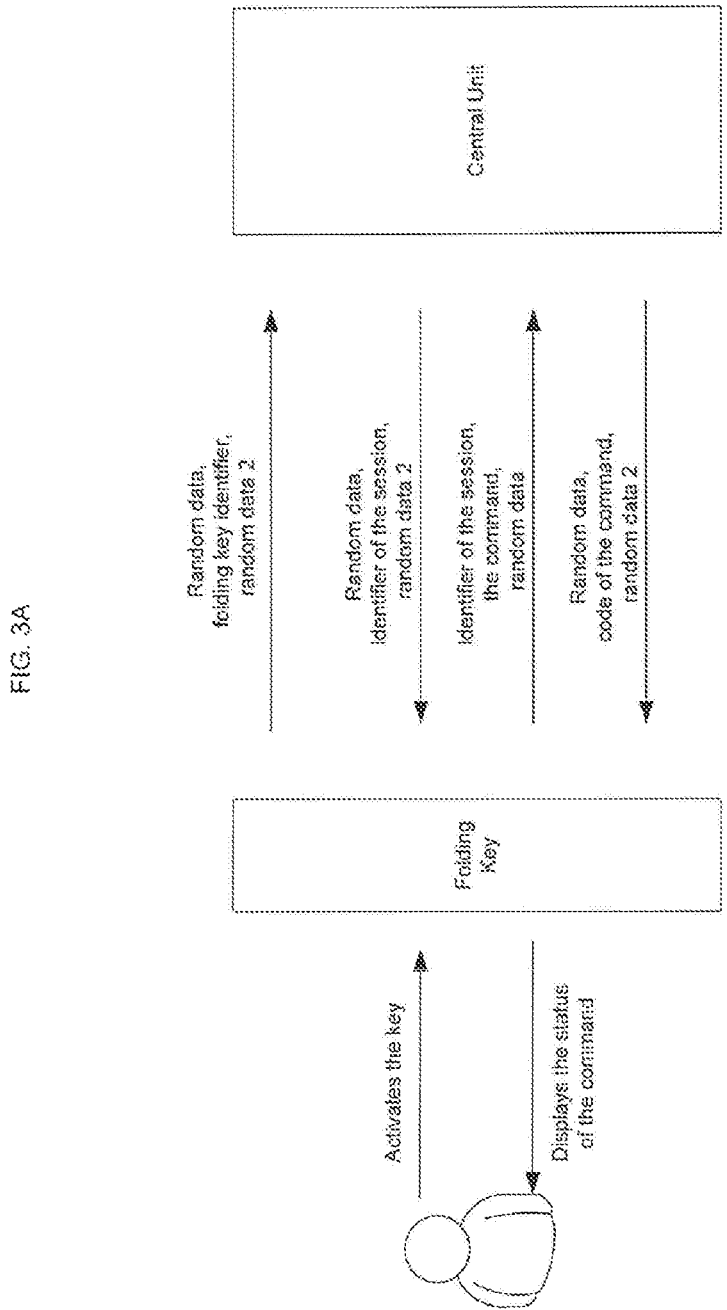
FIG. 3A is a depiction of one embodiment of invention where folding key and central unit are exchanging data through encrypted channel.
Figure 3B:
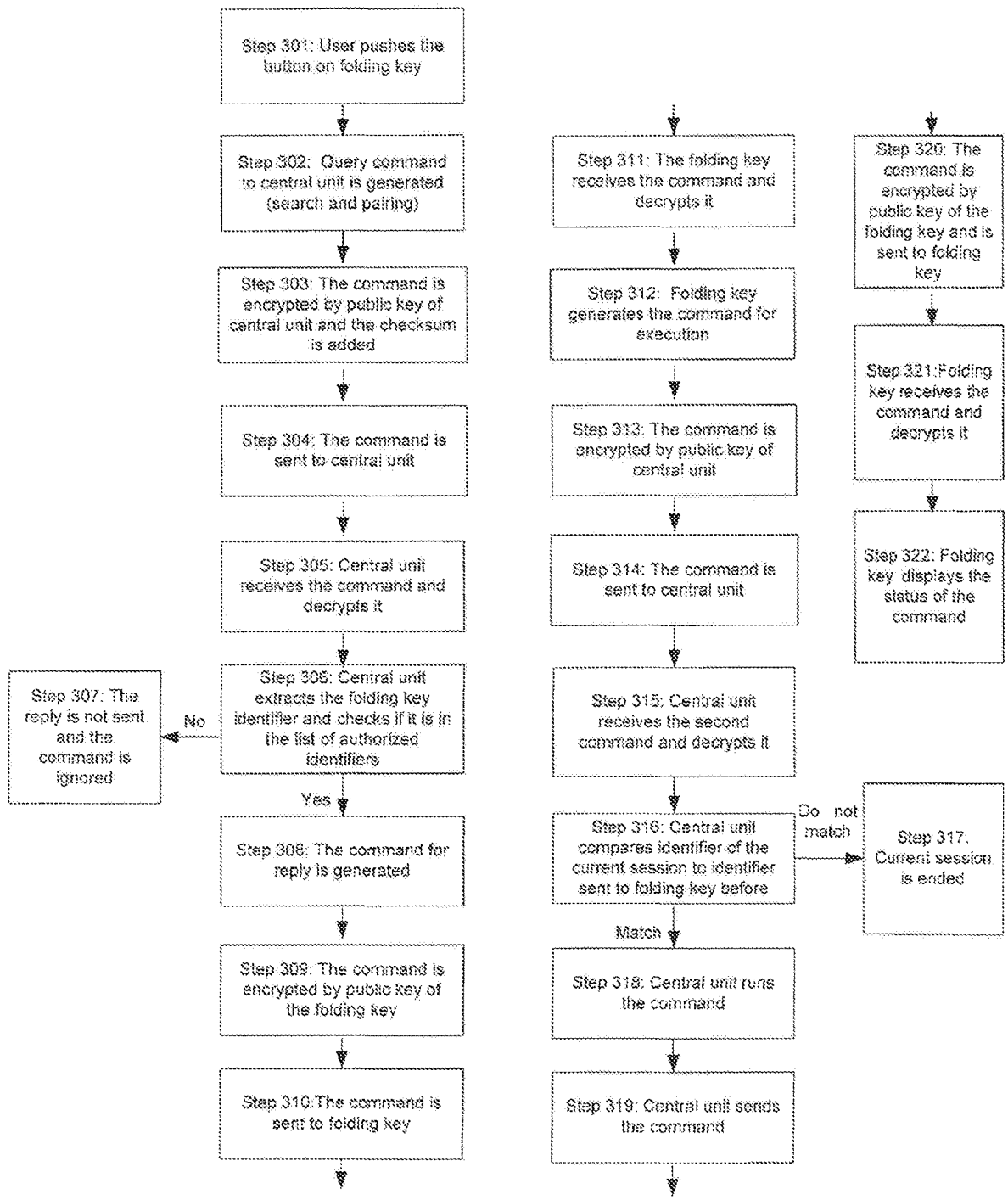
FIG. 3B is a flowchart of one embodiment of invention where folding key and central unit are exchanging data through encrypted channel.

FIG. 3A and FIG. 3B are depiction and flowchart of the invention where folding key 6 and central unit 2 are exchanging data through encrypted channel. In step 301 user 8 pushes the button on folding key 6. In step 302 there is generated the query command to central unit 2 (search and pairing). With search, after the query command is sent to the central unit the unique identifier is checked whether it is saved in memory of microcomputer of central unit. In other words there is implemented search of unique identifier in the memory. With pairing, if the unique identifier is found in the memory, the central unit allows the folding key, having this unique identifier, to communicate with the central unit. If the unique identifier is not found in the memory, the folding key is not allowed for communication and the pairing is failed.

The structure of the command is the following: random data (so called salt), folding key identifier, random data #2. Random data is a randomly generated sequence of bytes, it is called "salt" and random data (so called salt) means the first set of random data that is submitted to a buffer, which collects data for transfer to the central unit. Thereafter, the sensitive information like folding key identifier is submitted to the buffer. In the end the second set of random data, or random data #2, is submitted to the buffer. After that the buffer is encrypted and sent to the central unit. In step 303 the command is encrypted by public key of central unit 2 and the checksum is added. In step 304 the command is sent to central unit 2. In step 305 central unit 2 receives the command and decrypts it. In step 306 central unit 2 extracts the folding key identifier and checks if it is in the list of authorized identifiers. In step 307 if the identifier is not in the list the reply is not sent and the command is ignored. In step 308 if the identifier is in the list there is generated the command for reply. The structure of the command is the following: random data, unique identifier of the current session (each time there is generated new identifier, it is supposed to be returned in the second command from folding key right after receiving this one), random data #2. In step 309 the command is encrypted by public key of the folding key 6. In step 310 command is sent to folding key 6. In step 311 the folding key 6 receives the command and decrypts it. In step 312 it generates the command for execution. The structure of the command is the following: unique identifier of the current session (received from central unit 2 for this session), the command itself, random data. In step 313 it is encrypted by public key of central unit 2. In step 314 the command is sent to central unit 2. In step 315 central unit 2 receives the second command and decrypts it. In step 316 central unit 2 compares the identifier of the current session to the identifier sent to folding key 6 before. If identifiers do not match each other the current session is ended, step 317. If they match, step 318, central unit 2 runs the command. In step 319 central unit 2 sends the command. The structure of the command is the following: random data, the code of the command (success, failure, etc), random data #2. In step 320 the command is encrypted by public key of the folding key 6 and is sent to folding key 6. In step 321 folding key 6 receives the command and decrypts it. In step 322 folding key 6 displays the status of the command.

Figure 4B:
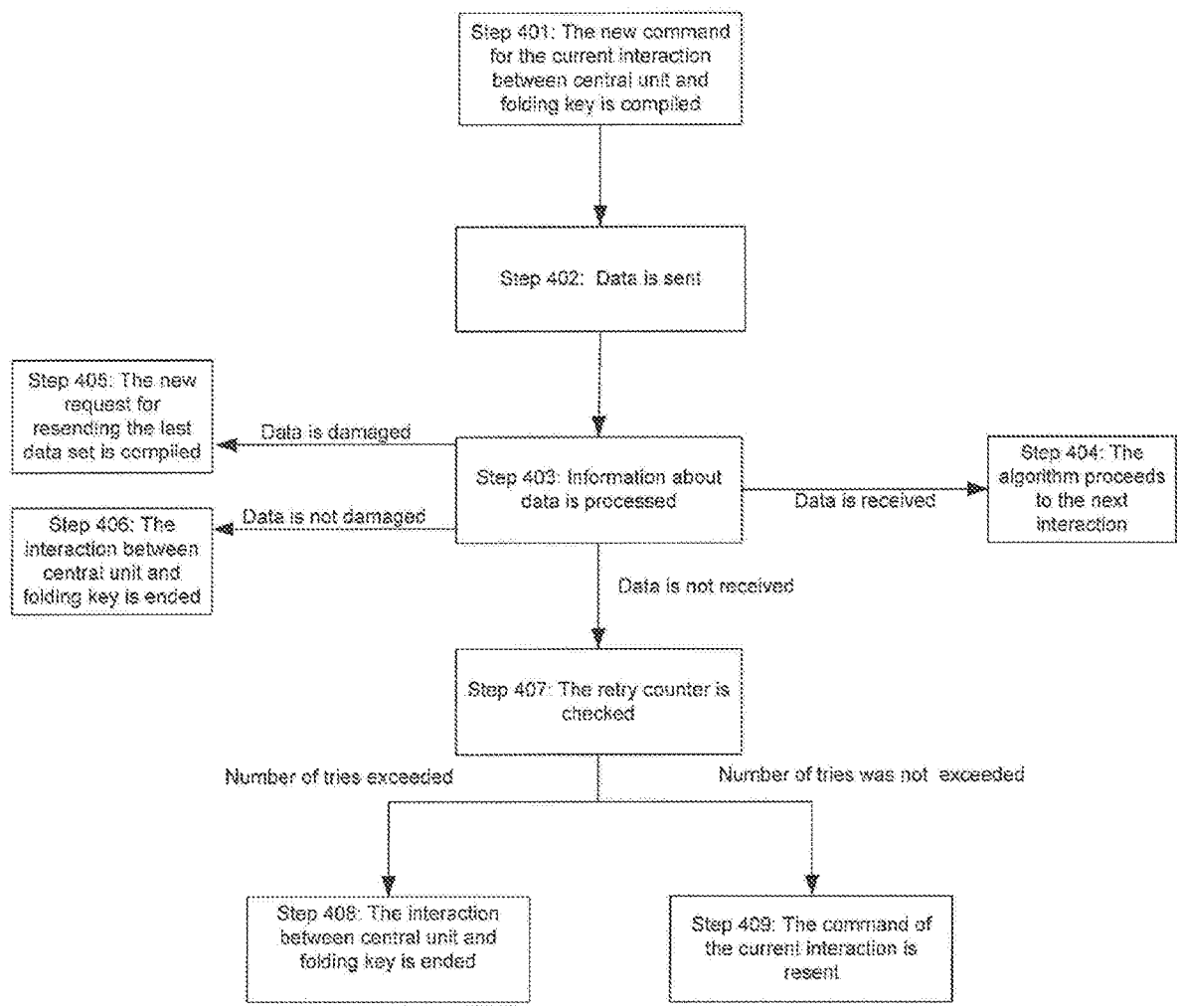
FIG. 4B is a flowchart of another embodiment of the invention where general algorithm of data interchanging between central unit and folding key is shown.

FIG. 4A and FIG. 4B are depiction and flowchart of the invention where general algorithm of data interchanging between central unit 2 and folding key 6 is shown. In step 401 the new command for the current interaction between central unit 2 and folding key 6 is compiled. In step 402 data is sent. In step 403, information about data is processed. In step 404 if data was received the algorithm proceeds to the next interaction. In step 405 if data is damaged the new request for resending the last data set is compiled. In step 406 if data is not damaged the interaction between central unit 2 and folding key 6 is ended. In step 407 if data was not received and timeout expired the retry counter is checked. In step 408 if number of tries was exceeded the interaction between central unit 2 and folding key 6 is ended. In step 409 if number of tries was not exceeded the command of the current interaction is resent.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for safe management of various devices of a vehicle where a central unit and folding key exchange data via encrypted channel comprising:
    combining a microcomputer, a transceiver and a controller into a central unit located on a vehicle;
    transmitting signals to a plurality of folding keys of the vehicle by said transceiver via at least one antenna;
    connecting said controller to a device that is to be controlled through wired or wireless connection; and
    forming a unique data set each time the folding key and central unit interchange data whereby the folding key and the central unit are exchanging data through an encrypted channel, by:
    pushing the button on folding key by user;
    generating query command to the central unit for search and pairing;
    structuring the command as the following: random data, folding key identifier, random data #2;
    encrypting the command by public key of the central unit and adding a checksum;
    sending the command to the central unit;
    receiving and decrypting the command by the central unit;
    extracting the folding key identifier by the central unit and checking said folding key identifier is in a list of authorized identifiers;
    ignoring the command if the identifier is not in the list;
    generating the command for reply if identifier is in the list; the structure of the command is the following: random data, unique identifier of the current session, random data #2;
    encrypting command by public key of the folding key;
    sending the command to the folding key;
    receiving and decrypting the command by the folding key;
    generating the command for execution by the folding key; the structure of the command is the following: unique identifier of the current session, the command itself, random data;
    encrypting the command by public key of the central unit;
    sending the command to the central unit;
    receiving the second command and decrypting said second command by the central unit;
    comparing the identifier of the current session to the identifier sent to folding key before by the central unit;
    ending current session if the identifiers do not match each other;
    running the command by the central unit if the identifiers match;
    sending the command by the central unit; the structure of the command is the following: random data, code of the command wherein the code of the command is success or failure, random data #2;
    encrypting the command by the public key of the folding key;
    sending the command to the folding key;
    receiving and decrypting the command by the folding key; and
    displaying a status of the command by the folding key.

2. The method for safe management of various devices of vehicle according to claim 1, where key pairs are initially generated by the central unit, comprising:
    generating key pair by central unit for said central unit before the first usage of the device;
    generating the key pair and unique identifier for folding key by central unit in the pairing mode for new folding key authorization;
    sending the key pair and unique identifier by central unit to folding key; and
    saving in memory of its microcomputer only public key and identifier without private key by central unit.

3. The method for safe management of various devices of vehicle according to claim 1, where there is presented data interchange between the central unit and the folding key, comprising:

compiling new command for the current interaction between central unit and the folding key;

sending data by the central unit, and;

processing information about said data by said folding key;

proceeding to the next interaction if the data was received by said folding key;

compiling new request for resending the data set if the data is damaged;

ending interaction between the central unit and the folding key if said data is not damaged;

checking retry counter if said data was not received and timeout expired;

ending interaction between the central unit and the folding key if number of tries was exceeded; and resending the command of the current interaction if number of tries was not exceeded.

4. The method for safe management of various devices of vehicle according to claim 1, where certificates are initially generated by the central unit, comprising:

generating certificate by the central unit for said central unit before the first usage of the device;

generating the certificate and unique identifier for the folding key by the central unit in the pairing mode for new folding key authorization;

sending certificate and unique identifier by the central unit to the folding key; and saving in memory of the microcomputer only public key and identifier without private key by central unit.

5. A system for safe management of various devices of vehicle where central unit and folding key exchange data via encrypted channel comprising:

a central unit located on vehicle;

a variety of folding keys of vehicle owner;

combining microcomputer, transceiver and controller by central unit;

one or more signals transmitted to folding keys by transceiver via antennas; and a controller connecting to a device that is to be controlled through wired or wireless connection the folding key and the central unit are exchanging data through an encrypted channel, by pushing the button on the folding key by user;

a query command generated to the central unit for search and pairing;

structuring the command as the following: random data, folding key identifier, random data #2;

the command encrypted by public key of the central unit and adding a checksum;

the command sent to the central unit which receives and decrypts the command by the central unit;

the folding key identifier extracted by the central unit and checking if said folding key identifier is in a list of authorized identifiers; and ignoring the command if the identifier is not in the list and generating the command for reply if identifier is in the list;

the structure of the command is the following: random data, unique identifier of the current session, random data #2;

the command encrypted by public key of the folding key and the command sent to the folding key;

the command received and decrypted by the folding key;

the command generating for execution by the folding key, where the structure of the command is the following: unique identifier of the current session, the command itself, random data;

the command encrypting by public key of the central unit;

the command being sent to the central unit; said central unit receiving the second command and decrypting said second command;

the identifier of the current session compared to the identifier sent to the folding key before by the central unit;

said current session ending if the identifiers do not match each other;

the command by the central unit run if the identifiers match;

the command by the central unit sent with the structure of the command is the following: random data, code of the command wherein the code of the command is success or failure, random data #2;

the command encrypted by the public key of the folding key and sent to the folding key;

the folding key receiving and decrypting the command; and the folding key displaying a status of the command.

* * * * *